(12) United States Patent
Taguchi et al.

(10) Patent No.: US 7,673,939 B2
(45) Date of Patent: Mar. 9, 2010

(54) SEAT BACK STRUCTURE

(75) Inventors: Masayuki Taguchi, Tokyo (JP); Yasuyuki Itou, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 12/108,266

(22) Filed: Apr. 23, 2008

(65) Prior Publication Data

US 2008/0265640 A1    Oct. 30, 2008

(51) Int. Cl.
*A47C 31/02* (2006.01)
(52) U.S. Cl. ............... 297/218.1; 297/218.2; 297/218.4; 297/218.5; 297/219.1; 297/228.1; 297/228.13
(58) Field of Classification Search ............... 297/219.1, 297/228.1, 228.13, 229, 218.1, 218.2, 218.3, 297/218.4, 218.5
See application file for complete search history.

(56) References Cited

U.S. PATENT DOCUMENTS

| | | | | |
|---|---|---|---|---|
| 4,047,756 A | * | 9/1977 | Ney | 297/228.13 X |
| 4,232,898 A | * | 11/1980 | Bodrero | 297/228.1 |
| 4,747,638 A | * | 5/1988 | Saito | 297/452.62 |
| 4,832,400 A | * | 5/1989 | Aoki et al. | 297/228.13 X |
| 4,844,539 A | * | 7/1989 | Selbert | 297/228.13 |
| 5,023,125 A | * | 6/1991 | Gray | 297/218.1 X |
| 5,028,472 A | * | 7/1991 | Gray | 297/218.1 X |
| 5,105,491 A | * | 4/1992 | Yoshiyuki et al. | 5/655.9 |
| 5,161,854 A | * | 11/1992 | Yokoto et al. | 297/182 |
| 5,295,732 A | * | 3/1994 | Boisset | 297/228.1 X |
| 5,560,683 A | * | 10/1996 | Penley et al. | 297/228.13 X |
| 5,615,928 A | * | 4/1997 | Penley | 297/228.13 X |
| 5,803,539 A | * | 9/1998 | Dewar et al. | 297/228.13 X |
| 6,067,777 A | * | 5/2000 | Stoll | 297/228.1 X |
| 6,079,779 A | * | 6/2000 | Tanaka et al. | 297/228.13 |
| 6,279,999 B1 | * | 8/2001 | Lee et al. | 297/218.1 X |
| 7,172,246 B1 | * | 2/2007 | Itakura | 297/219.1 |
| 7,255,405 B2 | * | 8/2007 | Kodera et al. | 297/452.62 |
| 7,419,213 B2 | * | 9/2008 | Itakura | 297/219.1 |
| 2008/0174158 A1 | * | 7/2008 | Ghisoni et al. | 297/218.3 |
| 2009/0160230 A1 | * | 6/2009 | Yasuda | 297/228.13 |

FOREIGN PATENT DOCUMENTS

| | | |
|---|---|---|
| JP | 2-177992 | 7/1996 |
| JP | 2005-262628 | 9/2005 |

* cited by examiner

*Primary Examiner*—Rodney B White
(74) *Attorney, Agent, or Firm*—Browdy and Neimark, PLLC

(57) ABSTRACT

Structure of seat back is provided, which comprises: a seat back frame; and an upholstery cover assembly including a forward upholster cover element and a backward upholstery cover element. Those two upholstery cover elements cover respective forward and backward sides of the seat back frame, with an upper region thereof secured on top portion of the seat back frame by a headrest stay holder element. Outer peripheral ends of those two upholstery cover elements are engaged together by an engagement element, so that substantially a whole of the seat back frame is covered with the upholstery cover assembly, thus forming a seat back.

4 Claims, 3 Drawing Sheets

SEAT BACK STRUCTURE

BACKGROUND OF THE INVENTION

1. Field of the Invention

The present invention relates to a seat back of automotive seat, and in particular to a structure of the seat back which is easy to assemble.

2. Description of Prior Art

As is known in the art, assembly of a seat back of automotive seat involves attaching a padding over a seat back frame to provide a basic seat back unit and then enclosing such seat back unit with a three-dimensional trim cover assembly. The three-dimensional trim cover assembly is preformed by connecting a plurality of cover materials with one another, as by sewing, so as to assume a predetermined three-dimensional configuration that substantially conforms to outer contour of the basic seat back unit.

Hitherto, various attempts have been made to allow for easy covering the basic seat back unit with the foregoing three-dimensional trim cover assembly.

For example, the Japanese Laid-Open Patent Publication No. 2-177992 (hereinafter, "JP'992") teaches a three-dimensional trim cover assembly having an opened region defined only in the lower bottom side thereof. In brief, according to the JP'992, at first, a whole of such three-dimensional trim cover assembly is turned over into a completely reversed state, so that entire reverse surfaces of the trim cover assembly are exposed outwardly, while entire outer surfaces of the same are disposed inside thereof. Then, a seat back frame and a foam padding are integrally secured to a backward side of such reversed trim cover assembly which corresponds to a backward side of a resulting seat back, and thereafter, a whole of the trim cover assembly is turned over and reversed relative to the backward side thereof, so that an entirety of the foam padding is covered with that particular trim cover assembly whose entire outer surfaces appear outwardly, In that manner, a finally finished seat back has the foam padding and seat back frame neatly disposed therewithin.

Also, known is a three-dimensional trim cover assembly having an local opened region defined in the backward side thereof for the purpose of allowing entry of seat back frame into the inside of trim cover assembly as well as for the purpose of allowing injection of a liquid foaming agent thereinto, as disclosed by the Japanese Laid-Open Patent Publication No. 2005-262628 (hereinafter, "JP'628") for example. According to that JP'628, the three-dimensional trim cover assembly comprises: an opened area defined centrally in the backward surface thereof; and a cover element substantially conforming in shape to such opened area, wherein the cover element is at one side integral with the opened area and connectable with that particular opened area by means of slide fasteners. In assembly, a seat back frame is first inserted through the opened area (which is not covered with the cover element at this point) into the inside of the trim cover assembly, after which, the trim cover assembly is placed in a foaming die and subjected to known foaming process involving injection of a liquid foaming agent through that opened area into the trim cover assembly. Finally, after having removed a resulting seat back from the foaming die, the cover element is connected with the opened area by engagement of the fasteners to close the corresponding local backward side of the seat back.

However, with regard to the JP'992, it is quite difficult to properly reverse the trim cover assembly so that both foam pad and seat back frame are neatly covered with such reversed trim cover assembly, which may cause the possibility that both or either of the trim cover assembly and foam padding will be damaged or broken.

On the other hand, in the JP'628, the trim cover assembly remains a closed three-dimensional part in the upper end portion thereof as opposed to the opened area thereof, which requires some die elements for supporting and retaining such closed three-dimensional part. Further, it is technically difficult to cure the liquid foaming agent into a satisfied mass of foam padding in that particular closed three-dimensional part.

Obviously, for both of those prior arts, great difficulty has remained in terms of filling a foam padding satisfactorily in the trim cover assembly as well as of neatly attaching both of the foam padding and trim cover assembly to a seat back frame.

SUMMARY OF THE INVENTION

In view of the above-stated drawbacks, it is a purpose of the present invention to provide an improved structure of seat back, which includes upholstery cover assembly effective for easy integral formation of both trim cover assembly and foam padding as well as for easy attachment of the upholster cover assembly itself to substantial a whole of seat back frame.

In order to achieve such purpose, the structure of seat back in accordance with the present invention is basically comprised of:

a seat back frame having: an upper frame portion provided with at least one support element, the upper frame portion facing upwardly of the seat back; a forward side facing forwardly of said seat back; and a backward side facing backwardly of the seat back;

at least one headrest stay holder element adapted for supportively receiving at least one headrest stay;

an upholstery cover assembly including:
  (a) a first upholstery cover element having a first engagement element;
  (b) a second upholstery cover element having a second engagement element adapted for engagement with the first engagement element of the first upholstery cover element;
  (c) an upper region including a connection portion where the first and second upholstery cover elements are integrally connected with each other, such upper region being defined upwardly of the seat back; and
  (d) at least one hole formed in the upper region;

said upholstery cover assembly being attached to substantially a whole of the seat back frame, such that the upper region thereof is securely retained on the upper frame portion of seat back frame by the afore-said at least one headrest stay holder element which is inserted through the afore-said at least one hole and securely received in the afore-said at least one support element associated with the seat back frame, that the first upholstery cover element covers the forward side of seat back frame, whereas the second upholstery cover element covers the backward side of seat back frame and that the first engagement element is engaged with the second engagement element;

the first upholstery cover element being comprised of: a trim cover assembly having an inward surface facing inwardly of the upholstery cover assembly toward the forward side of seat back frame; and a foam padding element fixed on the inward surface of trim cover assembly;

and the second upholstery cover element being comprised of: a trim cover assembly having an inward surface facing inwardly of the upholstery cover assembly toward the backward side of seat back frame; and a foam padding element fixed on the inward surface of trim cover assembly.

As one preferred aspect of the present invention, the first and second upholstery cover elements may be sewn integrally together at the connection portion defined in the upper region, and, excepting said connection portion, outer peripheral end of the first upholstery cover element be engaged with outer peripheral end of the second upholstery cover element by means of the first and second engagement elements.

Other various features and advantages of the present invention will become apparent from reading of the descriptions hereinafter, with reference to the annexed drawings.

DETAILED DESCRIPTION OF PREFERRED EMBODIMENT OF THE INVENTION

Referring to FIGS. 1 to 5, there is illustrated a preferred mode of seat back structure in accordance with the present invention.

Figure 4:
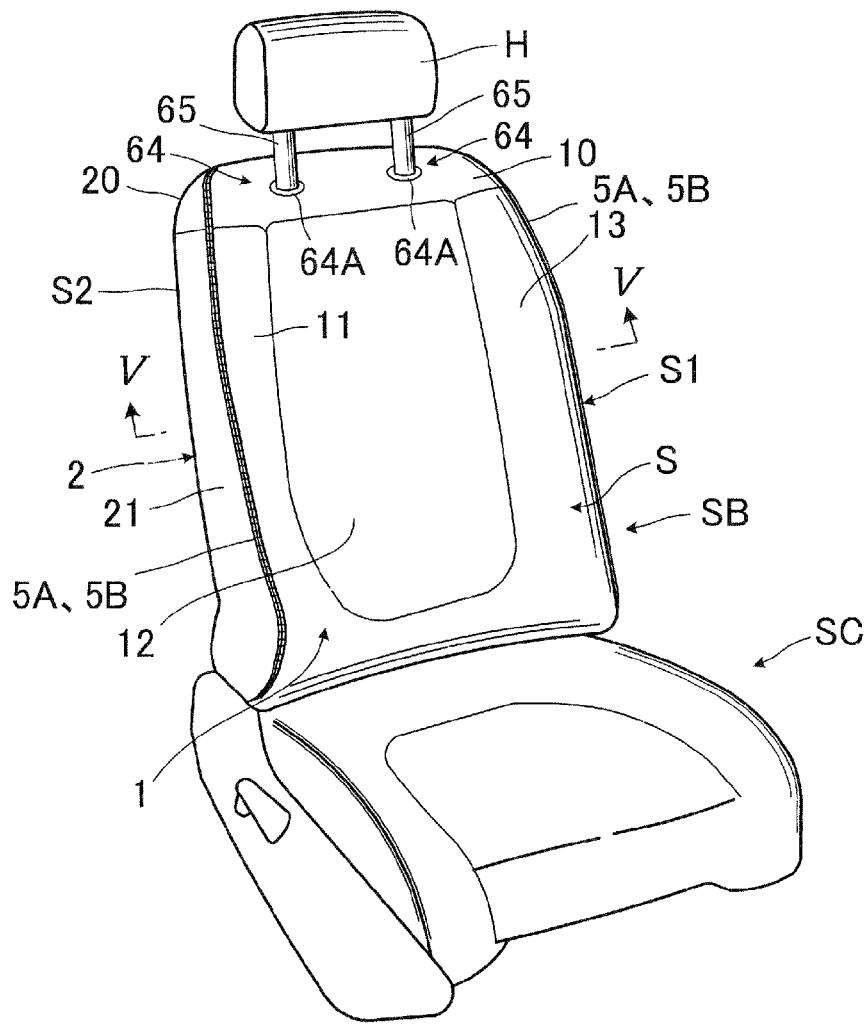
FIG. 4 is a schematic perspective of an automotive seat provided with the seat back structure of the present invention.

As seen from FIGS. 1 and 4, an automotive seat is provided, which comprises: an ordinary known seat cushion (SC); and a seat back (SB) having a headrest (H) mounted on the top thereof, the seat back (SB) being of a novel characteristic structure in the present invention as will be described hereinafter.

Figure 1:
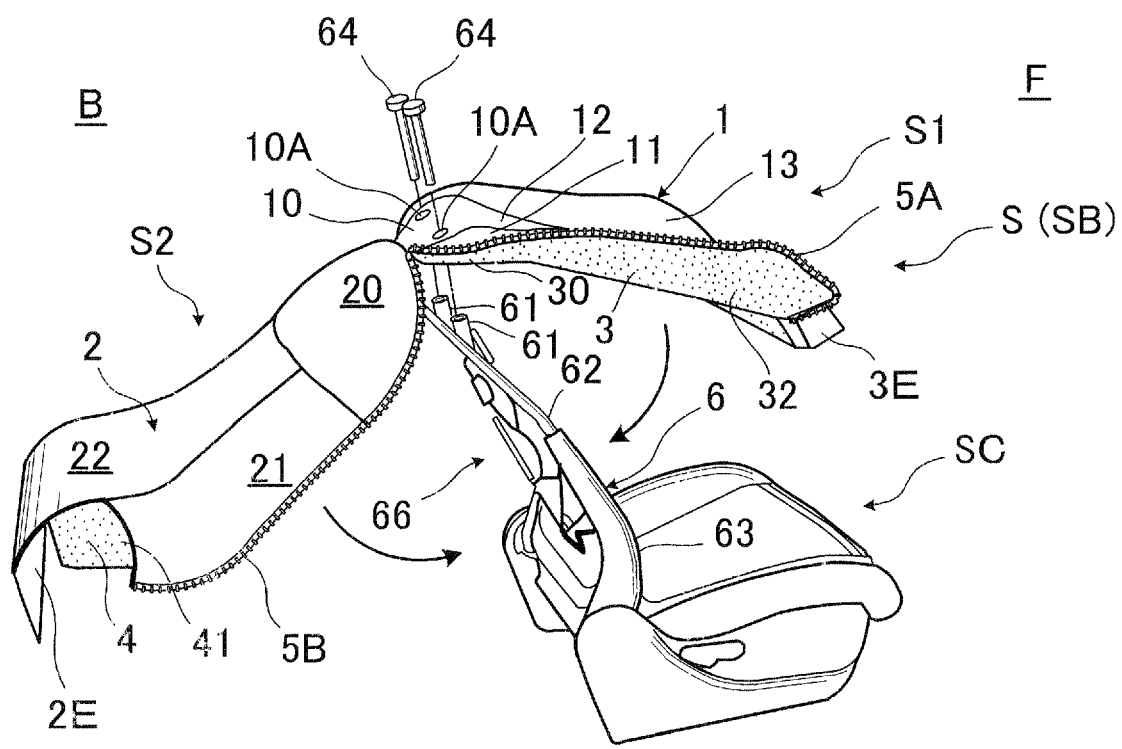
FIG. 1 is an exploded perspective view of a seat back structure in accordance with the present invention, which explanatorily shows how an upholstery cover assembly is securely attached to a seat back frame.
Figure 2:
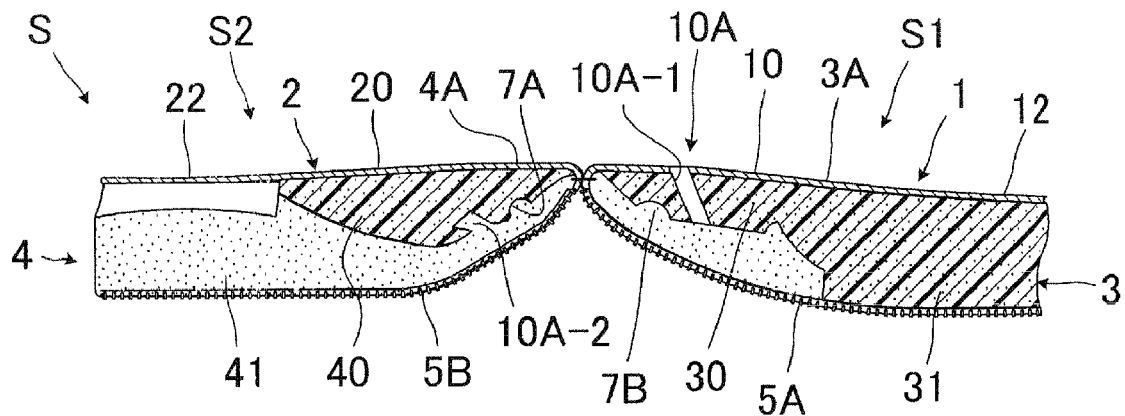
FIG. 2 is a fragmentary sectional view showing an upper portion of the upholstery cover assembly.

Designation (6) in FIG. 1 represents a conventional seat back frame which is at the lower end thereof connected with the seat cushion (SC). The seat back frame (6) is composed of a generally inverted-U-shaped upper frame member (62) and a pair of vertically extending lateral frame members (63) (63).

As ordinarily know in the art, the seat back frame (6) includes resilient support elements (66), such as a plurality of sinuous springs, which are extended between those two lateral frame members (63) in order to elastically support a back portion of a seat occupant. Also, as is known, a pair of tubular support members (61) and (61), adapted for supporting the respective two headrest stay holders (64) and (64) therein, are fixed on the upper frame member (62) of the seat back frame (6). Such two headrest stay holders (64) are so designed that a pair of headrest stays (65 and 65) are inserted and retained therein, respectively, as understandable from FIGS. 3 and 4.

In accordance with the present invention, there is provided an upholstery cover assembly for seat back, as generally designated by (S), which is characterized by comprising a forward upholstery cover half element (S1) and a backward upholstery cover half element (S2), such that both two upper end portions respectively of those two elements (S1) and (S2) are only connected with each other in an integral manner, as in FIG. 1. As will be elaborated later, in the present invention substantially an entirety of the seat back frame (6) is sandwiched between and covered with such two upholstery cover half elements (S1) and (S2), hence making assembly of seat back (SB) far more easy without any failure.

It is noted that the terms, "forward", "forwardly", and "frontal", all refer to a forward side (F) facing forwardly of the automotive seat (S) or seat back (SB), whereas the terms, "backward", "backwardly", and "rearward", all refer to a backward side (B) facing forwardly of the automotive seat (S) or seat back (SB).

The forward upholster cover half element (S1) is formed by: a frontal trim cover assembly (1); and a foam padding (3) integrally attached on the reverse side of that frontal trim cover assembly (1), as shown.

Specifically, the frontal trim cover assembly (1) may be preformed by sewing together a plurality of cover materials so as to assume a predetermined forward half configuration of seat back. As seen in FIGS. 1 and 4, the trim cover assembly (1) is formed such that a central cover region (12) is defined centrally thereof for receiving substantially a whole back portion of a seat occupant (not shown), and that, integrally connected with respective two sides of that central cover region (12) are a pair of lateral bolster cover regions (11) and (13). And further, integrally connected with upper end of the central cover region (12) is a forward upper cover region (10) which has integral connection with another backward upper cover region (20) associated with the backward upholstery cover half element (S2).

An engagement element, such as a first fastener element (5A), is provided to and along an outer terminal of each of the two lateral bolster cover region (11 and 13) as well as to and along an outer terminal of forward upper cover region (10). In this regard, the first fastener element (5A) may be provided to a localized part of the outer terminal of forward upper cover region (10), with other remaining part of that particular outer terminal being integrally connected with the backward upper cover region (20). Or, alternatively, the first fastener element (5A) be provided to and along entire terminals of both two lateral bolster cover regions (11) (13) and forward upper cover region (20).

It is preferable that the first fastener element (5A) as well as another second fastener element (5B) to be set forth are each defined along a bead line where a decorative bead (not shown) is to be normally formed on and along the respective two lateral sides of seat back (SB as well as upper portion of seat back (SB), so that the fastener elements (5A and 5B) themselves provide a decorative effect to a resultant seat back (SB). In that instance, more preferably, the decorative bead may be added adjacent to and along each of the two first fastener elements (5A), so that both mutually engaged first and second fastener elements (5A and 5B) will be concealed under that decorative bead, thereby attaining a far improved aesthetic appearance of the seat back (SB). Preferably, the first and second fastener elements (5A) (5B) may be a suitable slide faster or zipper.

It is also noted that, when applying the present invention to a seat back of type having a safety inflatable buffer means (e.g. the so-called air bags) in both lateral sides thereof, the foregoing fastener element (5A or 5B) may preferably be provided with an openable region defined therealong, so that the openable region may be easily torn and opened in an emergency case, thereby allowing the rapidly inflated buffer means to eject and expand therethrough to the outside of seat back. (Namely, a pair of spaced-apart inflated resilient balloons are ejected to protect the respective two lateral sides of a seat occupant.)

The foam paddling (3) per se, adapted for fixation to the trim cover assembly (1), is of a proper configuration having forward surfaces substantially conforming in contour to the respective afore-said cover regions (10), (11), (12) and (13) of the trim cover assembly (1). In other words, as can be seen from FIGS. 2, 3 and 5, the foam padding (3) is so formed to include: an upper padding region (30) having forward surface fixed on and along a contour of the upper cover region (10); a central padding region (31) having forward surface fixed on and along a contour of the central cover region (12); and a pair of lateral bolster padding regions (32) and (33), each having forward surface fixed on and along the respective two lateral bolster cover regions (11) and (13).

Designations (10A) and (10A) denote a pair of holes which are formed in the upper cover region (10) of trim cover assembly (1) in correspondence with the respective two tubular support members (61) and (61). Those two holes (10A) are adapted for allowing the respective two headrest stay holders (64) and (64) to pass therethrough, as will be described later.

Designation (10A-1) denotes a through-bore formed in the upper padding region (30) of the foam padding (3). While not clearly shown, it is to be understood that a pair of such through-bores (30) are actually formed in that upper padding region (30) in alignment with the respective foregoing two holes (10A) and thus adapted for allowing respective two headrest stay holders (64) to pass therethrough.

Designation (7B) stands for one half bore formed in the upper padding region (30). As understandable from FIGS. 2 and 3, such one half bore (7B) is mated and aligned with another half bore (7A) formed in an upper padding region (20) associated with the second upholstery cover assembly (S2), thus providing a bore though which the upper frame member (62) passes.

In this respect, formation of the foam padding (3) is for example such that the foregoing padding regions (30, 31, 32 and 33) may be either preformed independently of one another or preformed all together as one integral unit of padding. In any case, the foam padding (3) per se should be fixed to the reverse side of the trim cover assembly (1) as shown, by means of an adhesive for example, so that those padding regions (30, 31, 32 and 33) are firmly disposed on the respective cover regions (10, 12, 11 and 13). Or, alternatively, such fixation be done by a foaming process involving the steps of placing the trim cover assembly (1) in an appropriate foaming die, injecting a liquid foaming agent in such die, and subsequently curing the liquid foaming agent to form the afore-said foam padding (3) that is naturally fixed to the reverse side of trim cover assembly (1) in the above-described fashion.

However, the foaming process may raise the problem that the liquid foaming agent will be leaked outwardly from the lateral edges of trim cover assembly (1) to damage or break the fastener elements (5A), and therefore, it is recommended to use the earlier stated adhesive at the step of fixing the foam padding (3) to the trim cover assembly (1), no manner whether the foam padding (3) may comprise the independent pieces (30, 31, 32 and 33) or a unitary padding body mentioned above. For, not to mention, a thin layer of the adhesive applied on either of the foam padding (3) and trim cover assembly (1) will in no way be leaked through between such particular foam padding (3) and trim cover assembly (1), and for that reason the foam padding (3) can be fixed by the adhesive to the trim cover assembly (1) so as to dispose the outer edge of that particular foam padding (3) in close proximity with the fastener element (5A).

On the other hand, the backward upholstery cover half element (S2) is formed by: a rearward trim cover assembly (2); and a foam padding (4) integrally attached on the reverse side of that rearward trim cover assembly (2), as shown.

The rearward trim cover assembly (2) of this particular backward half element (S2) may also be preformed by sewing together a plurality of cover materials so as to assume a predetermined backward half configuration of seat back. As seen in FIGS. 1 and 4, formation of that trim cover assembly (2) is such that a rearward central cover region (22) is defined centrally thereof, and that, integrally connected with respective two sides of that rearward central cover region (22) are a pair of lateral cover regions (21) and (23). And further, integrally connected with top side of the rearward central cover region (22) is an backward upper cover region (20) which is shown to be connected with the previously mentioned forward upper cover region (10) associated with the first upholstery cover assembly (S1).

In this respect, another engagement element, such as a second fastener element (5B) adapted for releasable engagement with the foregoing first fastener element (5A), is provided to and along an outer terminal of each of the two lateral bolster cover regions (21 and 23) as well as to and along an outer terminal of the backward upper cover region (20). The second fastener element (5B) may be provided to a localized part of the outer terminal of backward upper cover region (20), with other remaining part of that particular outer terminal being integrally connected with the aforementioned backward upper cover region (20). Or, alternatively, the second fastener element (5B) be provided to and along entire terminals of both two lateral bolster cover regions (21) (23) and backward upper cover region (20).

The foam paddling (4) per se, adapted for fixation to the trim cover assembly (2), is of a proper configuration having forward surfaces substantially conforming in contour to the respective afore-said cover regions (20), (21), (22) and (23) of the trim cover assembly (2). In other words, as can be seen from FIGS. 2, 3 and 5, the foam padding (3) is formed to include: an upper padding region (40) having a surface fixed on and along a contour of the upper cover region (20); a central opened region (41) facing the rearward central cover region (22); and a pair of lateral padding regions (42) and (43) which are substantially fixed on and along the respective two lateral cover regions (21) and (23).

Designation (10A-2) denotes a cylindrical recession formed in the upper padding region (40) of the foam padding (4). As understandable from FIGS. 2 and 3, the cylindrical recession (10A-2) is aligned with the afore-said through-bore (10A-1), so that the bottom portion of the tubular support member (61) is stably and fit retained therein. While not clearly shown, it is to be understood that a pair of such cylindrical recessions (30) are actually formed in that upper padding region (40) in alignment with the respective two through-bores (10A-1) and thus adapted for receiving and retaining the two tubular support members (61), respectively.

In this respect, as likewise in the earlier stated foam padding (3), formation of the foam padding (4) of this particular upholstery cover half element (S2) may be such that the padding regions thereof (40, 42 and 43) is either preformed independently of one another or preformed all together as one integral unit of padding. Also, in brief, fixation of the foam padding (3) to the reverse side of rearward trim cover assembly (2) be done by means of adhesive, as previously stated. Or, a proper foaming process similar to the previously described foaming process be used for that purpose, although not specified here for the sake of simplicity.

As constructed above, in assembly of the seat back (SB), at the first stage, the seat back frame (6) is provided, and, as shown in FIG. 1, the upholstery cover assembly (S) is provided in the opened state wherein the forward and backward upholster cover elements (S1) and (S2) thereof are opened away from each other symmetrically relative to a top region (at 10 and 20) of the upholstery cover assembly (S). As can be seen from the FIG. 1, such top region of upholstery cover assembly (S) is brought to a point right above the two tubular support members (61) as well as above the upper frame member (61) of seat back frame (6), insuring that the two holes (10A) and (10A) are aligned with the respective two tubular support members (61) and (61). Then, the two headrest stay holders (64) and (64) are inserted through the respective two holes (10A) and (10A) and further inserted into the respective two tubular support members (61) and (61) until both two head portions (64A) and (64A) respectively thereof rest on the upper cover region (10), whereby that particular upper cover region (10) as well as the corresponding foam padding (30), associated with the forward upholder cover half element (S1), are pressed against the upper frame member (62). In that way, the top portion of the upholstery cover assembly (S) is easily and securely retained upon the seat back frame (6) by the two headrest holders (64) only, while at the same time, the forward and backward upholstery cover half elements (S1) and (S2) are readily located in front of the respective forward and backward sides of the seat back frame (6).

Thereafter, as indicated by the arrows in FIG. 1, the forward and backward upholstery cover half elements (S1) and (S2) are moved toward each other to contact the respective forward and backward sides of seat back frame (6). Namely, that particular seat back frame (6) is sandwiched between those two upholstery cover half elements (S1) (S2). Next, as understandable from FIG. 3 in conjunction with FIG. 1, the lower padding extension (3E) of forward upholstery cover element (S1) is folded about the seat back frame's lower frame member (64) in a direction backwardly of the seat back frame (6), and on the other hand, the lower cover extension (2E) of backward upholstery cover half element (S2) is juxtaposed on the thus-folded lower padding extension (3E) and folded therealong in a direction forwardly of the seat back frame (6).

At this point, though not clearly shown, the afore-said lower padding extension (3E) may be securely anchored by resin retainers or hog rings with a lower frame member (63A) of seat back frame (6), and then, the afore-said lower cover extension (2E) be connected with a lower edge of the central cover region (12) of frontal trim cover assembly (1), as by sewing.

Figure 3:
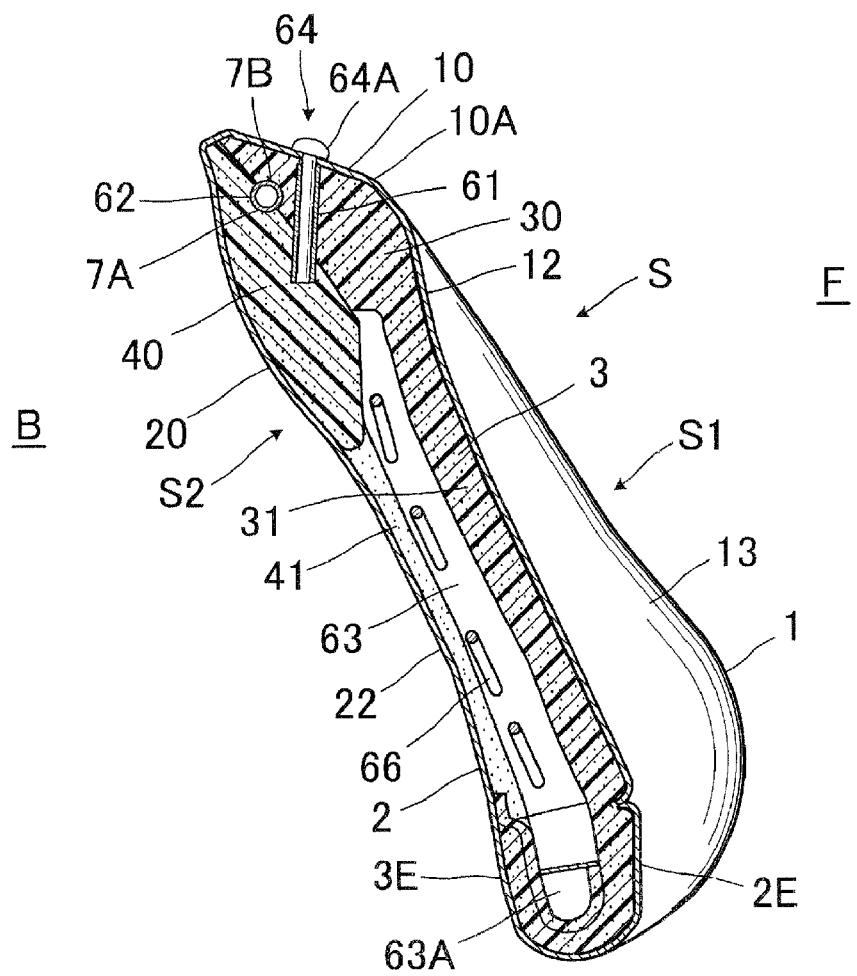
FIG. 3 is a longitudinally sectional view of the seat back structure.
Figure 5:
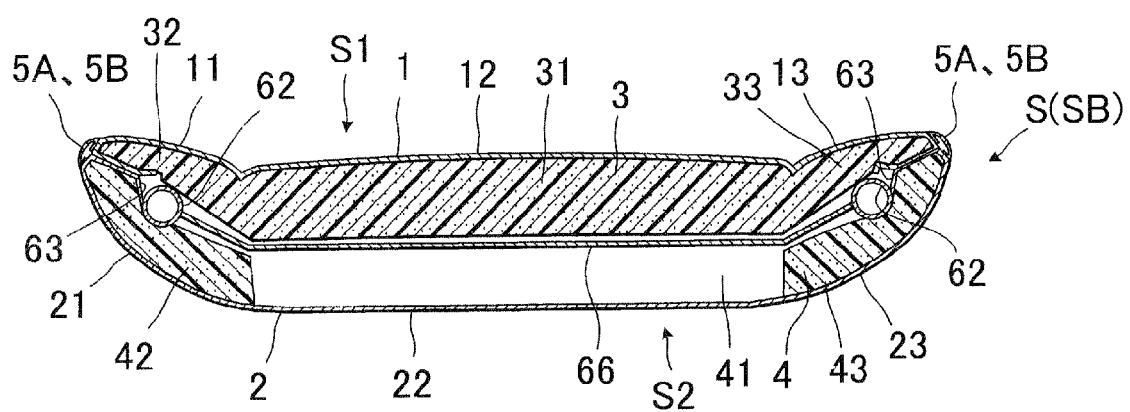
FIG. 5 is a sectional view taken along the line V-V in the FIG. 4

Finally, the first and second faster elements (5A and 5B) are engaged with each other, thereby engaging two lateral edges of the forward upholstery cover half element (S1) with respective two lateral edges of the backward upholstery cover half element (S2), whereupon substantially an entirety of the seat back frame (6) is covered with the upholstery cover assembly (S). Thus, a beautifully fished body of seat back (SB) is attained as seen in FIGS. 3, 4 and 5.

From the descriptions above, it is appreciated that the present invention has the following effects and advantages;

(i) The body of upholstery cover assembly (S) for covering substantially a whole of the seat cushion frame (6) is basically composed of only two half constituent elements; namely, a forward upholstery cover half element (S1) and a backward upholstery cover half element (S2). Hence, as opposed to the conventional preformed three-dimensional type of upholstery or trim cover assembly, the upholstery cover assembly (S) of the present invention does not have any deeply recessed region and does not have any three-dimensionally closed region, neither, during process for assembling together the two upholstery cover half elements (S1) (S2). In other words, for each of such two half elements (S1) (S2), the corresponding foam padding (3 or 4) may be simply and directly fixed to the corresponding trim cover assembly (1 or 2), without using any means or pieces for supporting local three-dimensional regions as found in the prior art. This greatly simplifies the assembly and also greatly reduces costs involved.

(ii) The top portion (at 10) of the upholster cover assembly (S) is formed with two holes (10A) for allowing the respective two conventional headrest stay holders (64) to pass therethrough. Further, the forward and backward upholstery cover half elements (S1) (S2) are respectively provided with the first and second fastener elements (5A) (5B). Thus, it is quite easy to securely attach the upholstery cover assembly (S) to substantially a whole of the seat back frame (6), because the conventional headrest stay holders (64) can be directly used to easily locate and retain the two half elements (S1) (S2) in front of the respective forward and backward sides of the seat back frame (6), and then, the two half elements (S1) (S2) can be easily engaged with each other by the fastener elements (5A and 5B) to thereby constitute upholstery cover assembly (S) that covers the seat back frame (6).

While having described the present invention so far, it should be understood that the invention is not limited to the illustrated embodiment, but any modification, replacement and addition may be applied thereto without departing from the scopes of the appended claims.

What is claimed is:

1. A structure of a seat back having a headrest mounted thereon, in which said headrest includes at least one headrest stay, comprising:
    a seat back frame having: an upper frame portion provided with at least one support element, said upper frame portion facing upwardly of said seat back;
    a pair of lateral frame portions extending vertically from said upper frame portion, said pair of lateral frame portions facing two lateral sides of said seat back, respectively;
    a forward side defined at one side of said upper frame portion and said pair of lateral frame portions, said one side facing forwardly of said seat back;
    a backward side defined at another side of said upper frame portion and said pair of lateral frame portions, said another side facing backwardly of said seat back;
    at least one headrest stay holder element adapted for supportively receiving said at least one headrest stay; and
    an upholstery cover assembly including:
    (a) a first upholstery cover element including:
        a cover area configured to cover said forward side of said seat back frame;
        a peripheral end portion adapted to be capable of substantially covering both said pair of lateral frame portions of said frame;
        said first upholstery cover element having a first engagement element provided to and along said peripheral end portion thereof;
        said first upholstery cover element being comprised of a trim cover assembly having a reverse surface and a foam padding element fixed on said reverse surface of said trim cover assembly;
    (b) a second upholstery cover element including:
        a cover area configured to cover said backward side of said seat back frame;

a peripheral end portion adapted to be capable of substantially covering both said pair of lateral frame portions of said seat back frame;

said second upholstery cover element having a second engagement element provide to and along said peripheral end portion thereof;

said second upholstery cover element being comprised of a trim cover assembly having a reverse surface and a foam padding element fixed on said reverse surface of said trim cover assembly;

(c) an upper region including a connection portion where said first and second upholstery cover elements are integrally connected with each other, said upper region being configured to cover said upper frame portion of said seat back frame; and (d) at least one hole formed in said upper region;

said upholstery cover assembly being attached to substantially a whole of said seat back frame, such that said upper region thereof is securely retained on said upper frame portion of said seat back frame by said at least one headrest stay holder element which is inserted through said at least one hole and securely received in said at least one support element associated with said seat back frame, that said first upholstery cover element covers said forward side of said seat back frame, whereas said second upholstery cover element covers said backward side of said seat back frame, and that said first engagement element is engaged with said second engagement element, thereby connecting both said peripheral end portions of said first and second upholstery cover elements integrally so as to cover all lateral side portions of said seat back frame, excepting said upper region, with the two foam padding elements respectively of said first and second upholstery cover elements facing inwardly of said upholstery cover assembly toward each other in contact with said seat back frame.

2. The structure of seat back as claimed in claim 1, wherein said first and second upholstery cover elements are sewn integrally together at said connection portion defined in said upper region, and excepting said connection portion, said peripheral end portion of said first upholstery cover element is connected with said peripheral end portion of said second upholstery cover element by means of said first and second engagement elements.

3. The structure of seat back as claimed in claim 1, wherein said first upholstery cover element includes an upper region corresponding to said upper region associated with said upholstery cover assembly, wherein said second upholstery cover element includes an upper region corresponding to said upper region associated with said upholstery cover assembly, wherein said trim cover assembly of said first upholstery cover element comprises:

a pair of bolster cover regions respectively defined in two forward lateral regions thereof, said pair of bolster cover regions facing forwardly of said seat back;

a frontal central cover region defined centrally thereof between said pair of bolster cover regions, said frontal central cover region facing forwardly of said seat back; and a forward upper cover region facing forwardly of said seat back, said forward upper cover region corresponding to said upper region;

wherein said pair of bolster cover regions each includes said peripheral end portion associated with said first upholstery cover element, with said first engagement element provided to and along said particular peripheral end portion;

wherein said reverse surface of said first upholstery cover element comprises reverse surfaces respectively of said frontal central cover region, said forward upper cover region and said pair of bolster cover regions, wherein said foam padding of said first upholstery cover element is fixed on said reverse surfaces respectively of said frontal central cover region, said forward upper cover region and said pair of bolster cover regions, wherein said trim cover assembly of said second upholstery cover element comprises: a pair of lateral cover regions respectively defined in the two lateral sides thereof, said pair of lateral cover regions facing backwardly of said seat back; a backward central cover region defined centrally thereof between said pair of lateral cover regions; said backward central cover region facing backwardly of said seat back, and a backward upper cover region facing forwardly of said seat back, said backward upper cover region corresponding to said upper region;

wherein said pair of lateral cover regions each includes said peripheral end portion associated with said second upholstery cover element, with said second engagement element provided to and along said particular peripheral end portion;

wherein said reverse surface of said second upholstery cover element comprises reverse surfaces respectively of said backward central cover region, said backward upper cover region and said pair of lateral cover regions, and wherein said foam padding of said second upholstery cover element is fixed on said reverse surfaces respectively of said backward central cover region, said backward upper cover region and said pair of bolster cover regions.

4. The structure of seat back as claimed in claim 1, wherein said first upholstery cover element includes an upper region having a connection portion defined therein, said upper region and said connection portion respectively corresponding to said upper region and said connection portion which are associated with said upholstery cover assembly, wherein said second upholstery cover element includes: an upper region having a connection region defined therein, said upper region and connection portions respectively corresponding to said upper region and said connection portion which are associated with said upholstery cover assembly, wherein said connection portion of said first upholstery cover element is integrally connected with said connection portion of said second upholstery cover element, wherein said at least one hole is formed in said upper region of said first upholstery cover region, wherein said trim cover assembly of said first upholstery cover element comprises:

a pair of bolster cover regions respectively defined in two forward lateral regions thereof, said pair of bolster cover regions facing forwardly of said seat back;

a frontal central cover region defined centrally thereof between said pair bolster cover regions, said frontal central cover region facing forwardly of said seat back; and a forward upper cover region facing forwardly of said seat back, said forward upper cover region corresponding to said upper region;

wherein said pair of bolster cover regions each includes said peripheral end portion associated with said first upholstery cover element, with said first engagement element provided to and along said particular peripheral end portion;

wherein said reverse surface of said first upholstery cover element comprises reverse surfaces respectively of said frontal central cover region, said forward upper cover region and said pair of bolster cover regions, wherein said foam padding of said first upholstery cover element is fixed on said reverse surfaces respectively of said frontal central cover region, said forward upper cover region and said pair of bolster cover regions, wherein said trim cover assembly of said second upholstery cover element Comprises:
- a pair of lateral cover regions respectively defined in the two lateral sides thereof, said pair of lateral cover regions facing backwardly of said seat back;
- a backward central cover region defined centrally thereof between said pair of lateral cover regions, said backward central cover region facing backwardly of said seat back; and
- a backward upper cover region facing forwardly of said seat back, said backward upper cover region corresponding to said upper region;

wherein said pair of lateral cover regions each includes said peripheral end portion associated with said second upholstery cover element, with said second engagement element provided to and along said particular peripheral end portion;

wherein said reverse surface of said second upholstery cover element comprises reverse surfaces respectively of said backward central cover region, said backward upper cover region and said pair of lateral cover regions, wherein said foam padding of said second upholstery cover element is fixed on said reverse surfaces respectively of said backward central cover region, said backward upper cover region and said pair of lateral cover regions, and wherein said upper cover region of said first upholstery cover element, excepting said connection portion, is engaged with said upper cover region of said second upholstery cover element, excepting said connection portion, by means of said first and second engagement element, and further, said peripheral end portions of said pair of bolster cover regions are engaged with said peripheral end portions of said pair of lateral cover regions, respectively, by means of said first and second engagement elements so as to cover all lateral side ortions of said seat back frame, excepting said upper region, with the two foam padding elements respectively of said first and second upholstery cover elements facing inwardly of said upholstery cover assembly towards each other in contact with said seat back frame.

* * * * *